UNITED STATES PATENT OFFICE.

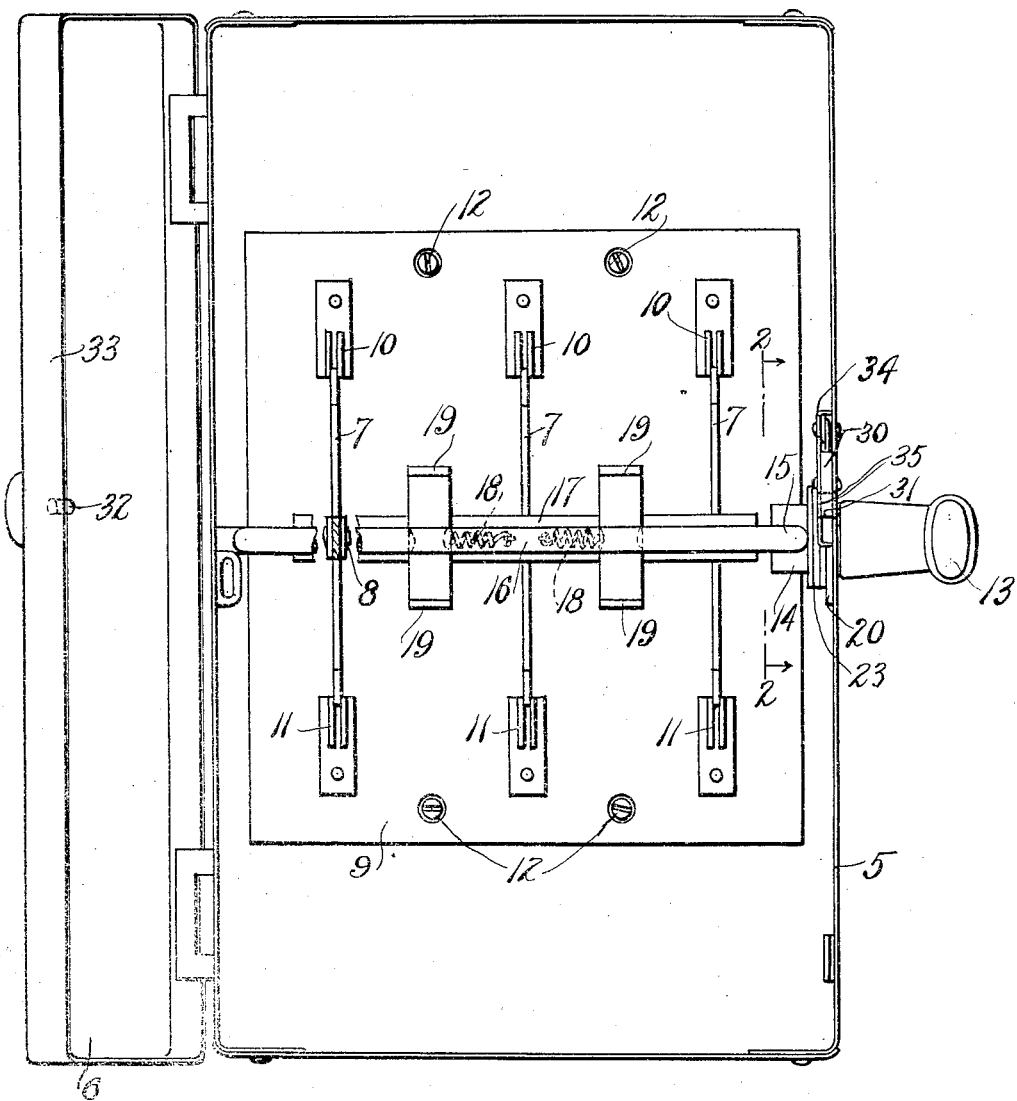

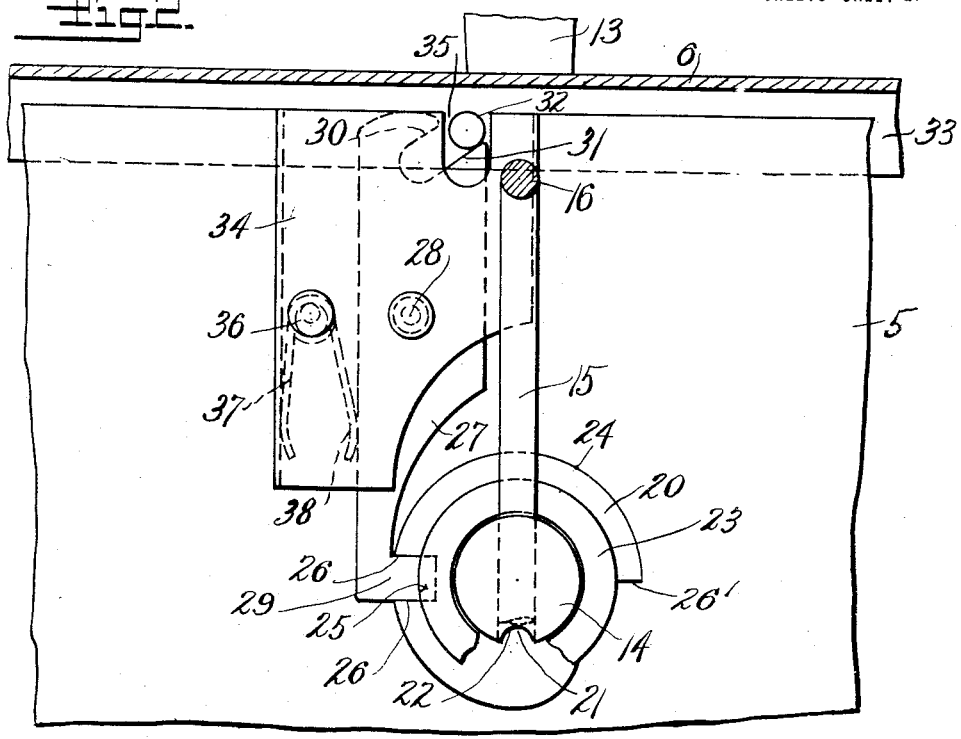

KNUD KNUDSEN, OF PLAINVILLE, CONNECTICUT, ASSIGNOR TO THE TRUMBULL ELECTRIC MFG. CO., OF PLAINVILLE, CONNECTICUT, A CORPORATION OF CONNECTICUT.

INCLOSED SWITCH.

1,310,163.  Specification of Letters Patent.  Patented July 15, 1919.

Application filed August 22, 1918. Serial No. 250,969.

*To all whom it may concern:*

Be it known that I, KNUD KNUDSEN, a subject of the King of Denmark, who have signified my intention of becoming a citizen of the United States of America and have taken out first papers and applied for second, residing in Plainville, Connecticut, have invented a new and useful Inclosed Switch, of which the following is a specification.

My invention relates to switches of the inclosed or protected type and has for its object the provision of simple and practical interlocking mechanism for preventing opening of the switch casing when the switch is closed and for preventing closing of the switch when the switch casing is open.

A further object is the provision of interlocking mechanism of this character adapted to be used interchangeably in either double-throw or single-throw switches.

According to my invention the cover of the switch casing is normally locked closed by means of a locking lever which makes engagement with a locking disk carried by the handle or switch operating device, said locking disk having a so-called "track" portion for holding the lever interlocked with the cover and a recessed portion providing a locking shoulder with which the lever can engage to lock the switch inoperative. The locking lever is preferably in the form of a simple straight lever pivoted intermediate its ends and having a hook at one end for engagement with the track and locking shoulder on the locking disk and a hook at its opposite end for engagement with a locking element on the cover, said lever furthermore having an abutment surface which will be engaged by the cover-carried element in the closing movement of the cover to rock the lever and by one and the same movement to unlock the lever from the locking washer and interlock the lever with the cover-carried element.

Other features of the invention will appear as the specification proceeds.

In the accompanying drawings I have illustrated my invention as embodied in a concrete and practical form, it being understood however, that the precise form of the invention may be varied without departure from the true spirit and scope of the invention.

In these drawings:—

Figure 1, is a front view of the three-pole double-throw inclosed switch having the features of the invention incorporated therein, the cover of the switch casing being open in this view and the switch being locked in the intermediate or neutral position, parts being shown broken away and in section.

Fig. 2, is an enlarged sectional view taken substantially on the plane of the line 2—2 in Fig. 1 showing the switch operating means locked and the cover released and in the act of being opened, certain parts being broken away.

Fig. 3, is a similar view showing the switch operating means unlocked and the cover locked closed.

The box or switch casing 5 is shown made up of sheet metal as customary in this art and is provided with a hinged cover 6.

The switch illustrated is of typical construction embodying a series of three double-armed switch blades 7 pivoted at 8 on the switch base 9 and adapted when rocked in reverse directions to be engaged with one set or the other of the contact clips 10 and 11. This switch may be secured within the casing as by means of the screws 12 passed through the insulating switch base 9 into engagement with the back or rear wall of the box.

The operating means for the switch is shown in the form of a handle 13 having a hub portion 14 pivoted in the side wall of the casing and with which is engaged a rod 15, said rod having a portion 16 over-standing the cross bar 17 which connects the several switch blades and connected with said coss bar in the present instance through the instrumentality of the quick break-springs 18 and the "lost-motion" connection arms 19 upstanding from the cross bar and disposed at opposite sides of the operating arm 16. The operation of the handle 13, through the medium of the connections described, imparts a positive movement to the movable switch element when the lost-motion between the operating arm 16 and abutments 19 is taken up and the springs 18 serve to impart a quick break movement to the movable switch element in the act of opening the circuit.

Carried by the switch operating means is an element in the nature of a locking disk, the same being here shown as a separately formed disk 20 fastened upon the hub portion of the handle by means of an integral inwardly projecting key 21 engaged in a corresponding keyway 22 formed in said hub. Other means of securing this locking disk on the hub of the handle may be utilized if found more desirable. One or a series of spacing washers 23 may be placed on the hub between the point where the rod 15 is engaged therewith and the locking disk to hold the disk properly positioned against the side wall of the box. The locking disk is formed with a track or raised portion 24 terminating in a notch or recess 25 providing spaced locking shoulders 26.

27 designates the locking lever which is shown as a substantially straight, simple lever pivoted intermediate its ends at 28 and provided at its lower end with a hook or tooth 29 adapted to ride on the raised track 24 of the locking disk and to drop into the notch 25. This lever is shown slotted in the upper end corner portion thereof on an incline to the longitudinal axis of the lever to thereby provide a laterally projecting hook member 30 and an inclined abutment surface 31 below the same, these two separated portions forming in effect, a pair of jaws to receive between them the locking pin or lug 32 carried by the dependent rim portion 33 of the cover. The holding jaw 30 which over-stands the abutment jaw 31 is of lesser extent than said abutment jaw or in other words, the abutment jaw projects beyond the end of the holding jaw so that it will be engaged by the cover-carried locking element in the closing movement of the cover and form a means by which the lever will be rocked to carry the holding jaw over the pin 32.

The locking lever may be mounted in a suitable housing 34 secured to the side of the switch casing and this housing with the adjacent side wall of the switch casing are shown slotted at 35 to admit the locking pin 32.

The locking lever is acted upon by a spring, shown as a hairpin spring, supported at 36 and having spaced arms 37 and 38, one of them bearing against a fixed abutment, such as the wall of the housing 34, and the other bearing upon the locking lever. This spring is shown as engaging the locking lever at a point below the pivot thereof, tending to rock the lever in a direction to free it of the cover-carried element and to hold the hook at the lower end of the lever firmly engaged with either the track or the locking shoulder of the locking washer.

The operation, it is believed, will be clear from the foregoing. In the position indicated in Fig. 3 the hook at the upper or outer end of the locking lever is engaged over the cover-carried element and the cover is thereby locked closed. Release of the locking lever is prevented by means of the engagement of the raised track portion 24 with the hook on the lower end of the lever. When however, the switch operating handle is thrown to carry the movable switch element to the neutral or inoperative position the cover can then be opened, the lifting of the cover simply serving to rock the hook on the upper end of the lever free of the locking pin 32, the hook at the lower end of the lever at this time dropping into the notch 25 in the locking washer. By this engagement of the hook on the lower end of the lever in between the locking shoulders, the switch operating means is positively locked and cannot be operated in either direction and this remains the case so long as the cover is open. In the closing movement of the cover the pin 32 carried by the cover first engages the abutment jaw 31 at the upper end of the lever, which, serving as an inclined cam, causes the lever to be rocked in a direction to carry the locking jaw 30 over the top of the locking pin and to free the hook 29 from the locking shoulders of the disk (see first Fig. 2 and then Fig. 3). The switch is now free to be operated and as soon as it is operated in either direction the raised track portion 24 thereof by engagement with the hook 29 will secure the lever in the position indicated in Fig. 3 with the cover locked closed. With the cover locked closed, the switch is free to be operated in either or both directions and the cover can only be opened when the switch is in the intermediate inactive position. Also the cover cannot be opened even in this position until the switch becomes locked in such inactive condition.

With double-throw switches it is necessary that the switch be locked against movement in either direction from the intermediate position and it is therefore necessary to provide a notch in the locking disk with which the hook on the locking lever may be engaged to secure the switch against movement either way. With a single-throw switch it is essential merely that the switch be held against movement in only one direction—the circuit-closing direction. In order that the locking disk may be suited to either double-throw or single-throw switches, I have shown the locking disk formed with a single locking shoulder 26' disposed substantially diametrically opposite the locking shoulders 26. The keying engagement with the handle permits the locking disk being reversed to bring the single locking shoulder 26' into position to coöperate with the locking lever. For single-throw switches therefore it is merely necessary to reverse the locking disk whereupon it will serve in coöperating with the locking lever to prevent circuit-closing movement of a single-throw switch.

I claim:—

1. In an inclosed switch, a switch casing provided with a movable cover, a switch in said casing having a movable switch element, switch operating means, a locking disk carried by said switch operating means provided with a track terminating in an abrupt locking shoulder, a substantially straight lever pivoted intermediate its ends in the casing and provided with a hook at one end to engage with the locking shoulder and to bear upon the track aforesaid, a locking element carried by the cover, a hook on the opposite end of the lever adapted to be held engaged over the cover-carried element when the first mentioned hook is in engagement with the track aforesaid and an abutment surface on the lever adapted for engagement by the cover-carried element to rock the lever and to carry the hook thereon out of engagement with the locking shoulder.

2. In an inclosed switch, a casing provided with a movable cover, a switch in the casing having a movable switch element, switch operating means, a locking disk carried by said switch operating means provided with a track terminating in an abrupt locking shoulder, a locking element on the cover, a locking lever pivoted intermediate its ends in the casing and provided at its opposite ends with hooks extending both toward the same side of the lever, a spring acting to rock the lever to hold the hook at one end thereof engaged with the locking disk and the hook at the opposite end thereof free of the cover-carried element and an abutment surface on the lever engageable by the cover-carried element to rock the lever against the tension of said spring.

3. In an inclosed switch, a switch casing provided with a movable cover, a switch in said casing having a movable switch element, a switch operating handle having a hub portion journaled in the casing, a locking disk on said hub and provided with a track and an abrupt locking shoulder, a locking element on the cover and a pivoted locking device having hooks for engagement with said track and locking shoulder, and with the cover-carried locking element respectively, said locking disk being reversibly connected with the hub whereby said disk may be mounted on the hub with the locking shoulder thereon in different relations to the pivoted locking device.

4. An inclosed switch comprising a box provided with a hinged cover, a switch mounted on the bottom of said box, a switch operating handle journaled in the box, a shouldered locking disk connected with said handle, a locking pin carried by the cover, a relatively long and narrow locking lever pivoted intermediate its ends at a point between the locking disk and the outer edge of the box, said locking lever having a shoulder at its lower end for interlocking engagement with the shoulder on the locking disk and a catch at its upper end for interlocking engagement with the locking pin on the cover, a spring for urging the shouldered lower end of the locking lever into engagement with the shoulder on the locking disk, and a track on said locking disk engaging the shouldered lower end of the locking lever to hold the same rocked into position with the catch on the upper end thereof interlocked with the locking pin on the cover.

5. In an inclosed switch, a casing provided with a movable cover, a switch in said casing having a movable switch element, operating means for said movable switch element, a locking disk carried by said operating means provided with a track terminating in an abrupt locking shoulder, a locking element carried by the cover, a locking lever pivoted intermediate its ends in the casing and provided with a hook at one end for engagement with the track and locking shoulder aforesaid and a hook at its opposite end for engagement with the cover-carried locking element, a relatively stationary abutment, a two-armed hairpin spring bearing with one arm on said stationary abutment and its other arm on the locking lever.

6. In an inclosed switch, a casing provided with a movable cover, a switch in said casing having a movable switch element, a switch operating member connected with the movable switch element, a locking disk reversibly engaged with said switch operating member and provided with a single locking shoulder and with a pair of spaced locking shoulders substantially oppositely disposed, said disk further having a track between the single locking shoulder and the pair of locking shoulders, a pivoted locking lever having a hook for engagement with the single locking shoulder or between the pair of locking shoulders, according as to how the disk is positioned with respect to the operating member, a locking element carried by the cover and locking means on the lever for coöperation therewith.

7. In combination, a switch casing provided with a movable cover, a double-throw switch mounted in said casing, an operating handle for said double-throw switch, a locking disk carried by said handle having a track provided with a notch therein, a locking element carried by the cover, a pivoted locking lever having a hook portion for engagement with said cover-carried locking element and a hook adapted to bear on the track and to drop into the notch therein to lock the operating handle against movement in both directions, the dropping of said hook into said notch being adapted to free the lever from locking engagement with the cover-carried element.

KNUD KNUDSEN.